Figure 1:
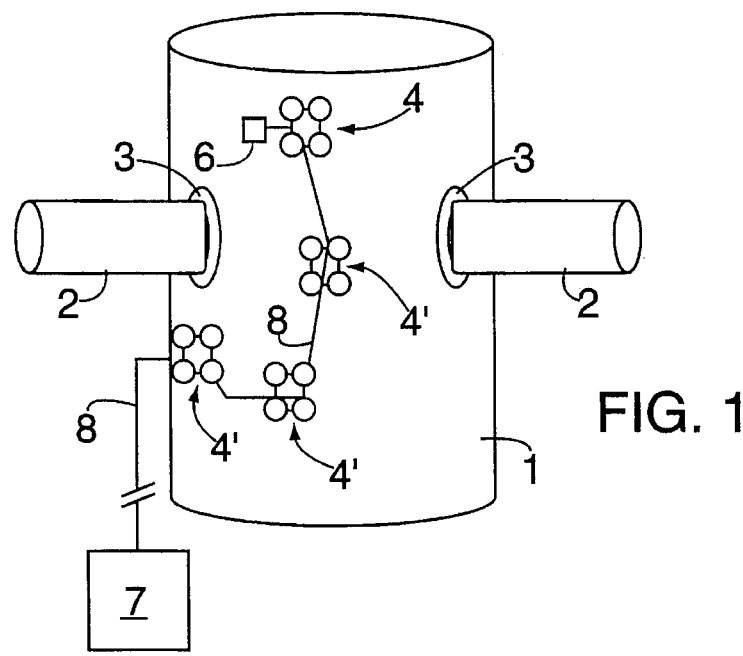

United States Patent
Yberle

[11] Patent Number: 5,575,346
[45] Date of Patent: Nov. 19, 1996

[54] TRANSPORT DEVICE

[76] Inventor: Hans Yberle, Am Weinberg 27, D-92318 Neumarkt, Germany

[21] Appl. No.: 356,367
[22] PCT Filed: Apr. 26, 1994
[86] PCT No.: PCT/DE94/00456
  § 371 Date: Dec. 23, 1994
  § 102(e) Date: Dec. 23, 1994
[87] PCT Pub. No.: WO94/25329
  PCT Pub. Date: Nov. 10, 1994

[30] Foreign Application Priority Data

Apr. 27, 1993 [DE] Germany ............ 43 13 719.9

[51] Int. Cl.$^6$ .................................. B62D 57/02
[52] U.S. Cl. ............................... 180/8.6; 901/1
[58] Field of Search ............... 180/8.1, 8.2, 8.3, 180/8.5, 8.6; 901/1

[56] References Cited

U.S. PATENT DOCUMENTS

| 4,674,949 | 6/1987 | Kroczynski | 180/8.6 X |
| 4,940,382 | 7/1990 | Castelain et al. | 180/8.5 X |
| 5,094,311 | 3/1992 | Akeel | 180/8.6 X |
| 5,161,631 | 11/1992 | Urakami | 180/8.5 X |
| 5,351,626 | 10/1994 | Yanagisawa | 180/8.6 |
| 5,351,773 | 10/1994 | Yanagisawa | 180/8.5 |

FOREIGN PATENT DOCUMENTS

| 0430161 | 5/1991 | European Pat. Off. | |
| 2607093 | 5/1988 | France. | |
| 60-206791 | 10/1985 | Japan | 180/8.5 |
| 1266941 | 10/1986 | U.S.S.R. | 180/8.5 |

Primary Examiner—Kevin T. Hurley
Attorney, Agent, or Firm—Lucas & Just

[57] ABSTRACT

The invention relates to a novel configuration of a transport means (5) for a controlled, striding motion along a substrate (14), having several striding elements each comprising a standing or foot element capable of being lowered and raised, respectively, for placement in contact with and removal from contact with the said substrate by means of a lift element (12) in a first axial direction, and having servo links (10) acting between the striding elements (9) to generate a linear relative motion in each instance between two striding elements (9) within a preassigned travel in an axis of motion.

22 Claims, 2 Drawing Sheets

TRANSPORT DEVICE

There is a known transport means for implements capable of being moved on a substrate with a striding motion (European Patent EP 0,084,012).

This known transport means consists of two rigid frame parts or polygons on each of which several foot or retaining elements comprising suction cups are provided. One of the said two polygons forms an outer polygon, and one of the two forms an inner polygon. The inner polygon is located within the outside dimensions of the outer polygon, and is thus guided on the outer polygon displaceably in an axial direction. For the striding motion, the polygons are moved successively in time relative to each other, namely in axial direction of the said guidance.

One disadvantage of the known transport means is that the outer polygon is of relatively large dimensions in order to attain the requisite length of stride. For this reason, it is not possible, or at least extremely difficult, to move the known transport means in a confined space and/or to execute a change of direction. In the known case, this is possible only by swinging the polygons about an axis extending perpendicular to the substrate.

The object of the invention is to specify a transport means affording, with minimal outlay, a high mobility even in a confined space, and small dimensions.

According to the invention, at least three striding elements and at least three servo elements are provided, each acting upon or connecting two striding elements, so that a polygon-like arrangement results over all, its sides formed by the servo elements, which by their travel effect a shortening or lengthening of the side in question and which at least in part are each articulately connected to the striding elements.

The transport means according to the invention is for example part of a system comprising a plurality of transport means, which are then to travel as a group, controlled by a common control means.

In its preferred application, the transport means according to the invention is a component of an operating, measuring or monitoring apparatus, in particular for service in dangerous environments, for example within the radiation zone of nuclear installations, for example nuclear reactors. In this application also, preferably a plurality of transport means are provided, controlled and moved as a group by a common control means, at least one transport means being part of a robot comprising the operating, measuring or testing apparatus, and additional transport means being components of auxiliary robots serving for holding and handling lines, bundles of lines, auxiliary apparatus etc.

Modifications of the invention are the subject of the subsidiary claims.

Figure 4:
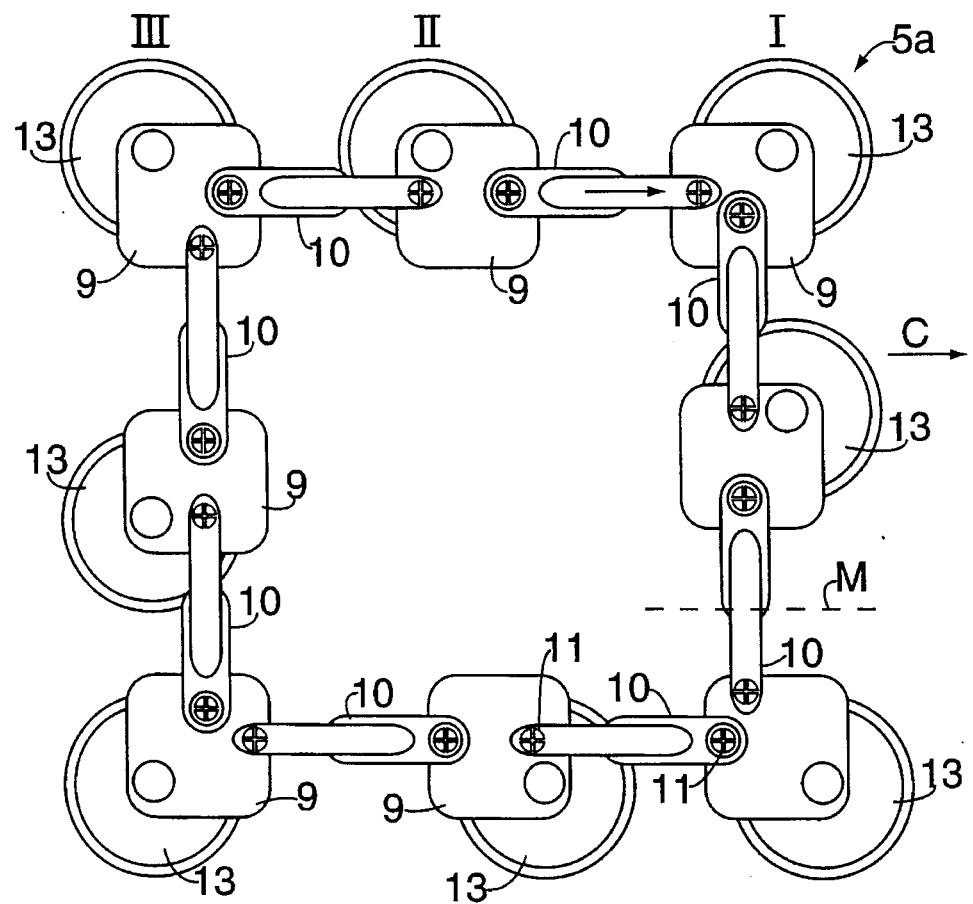
Figure 3:
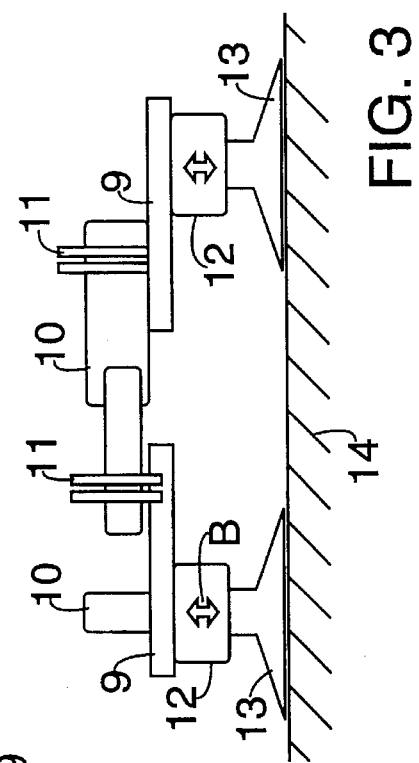
Figure 2:
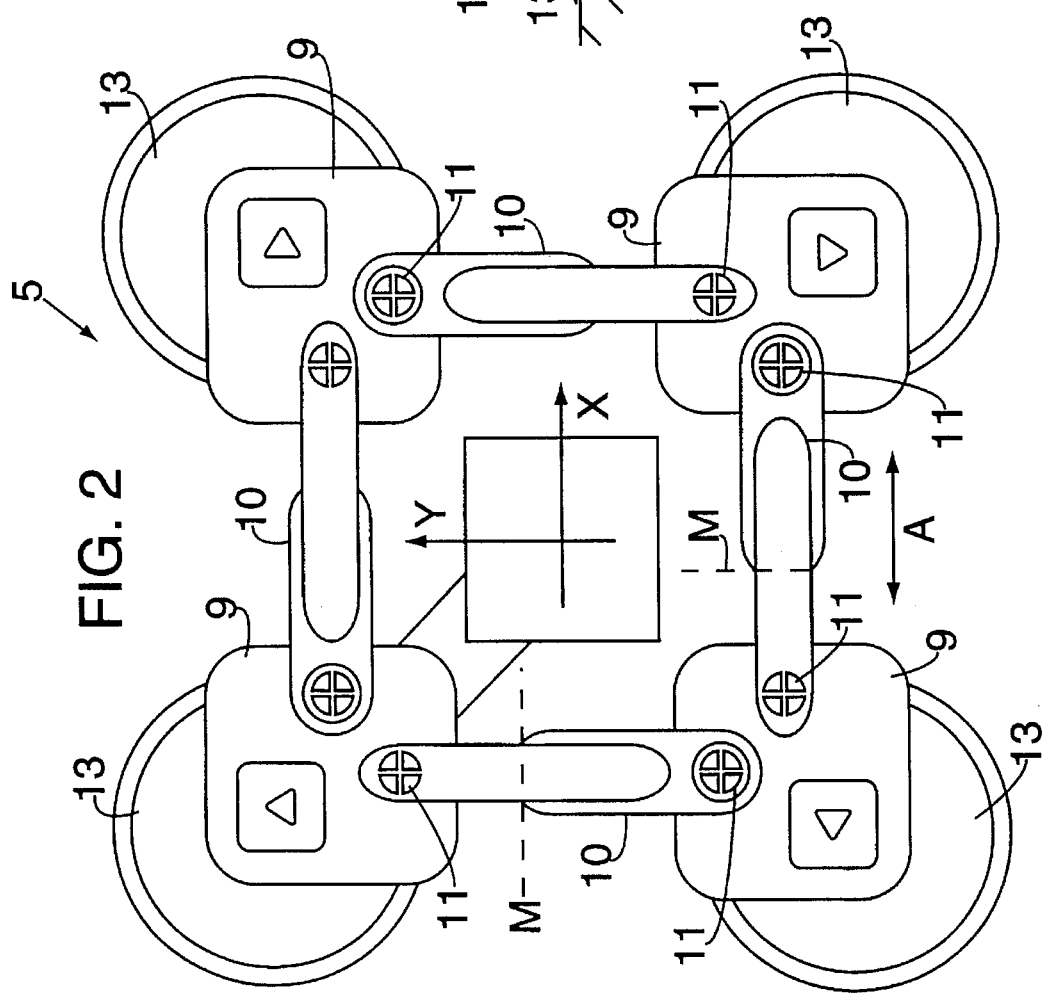

The invention will be illustrated in more detail in the following in terms of embodiments by way of example, with reference to the figures:

FIG. 1, in schematic representation and in side view, shows a pressure cylinder of a nuclear powerplant, together with a measuring means arranged in the radiation zone for inspection of said pressure cylinders, with several transport means according to the invention;

FIG. 2, in simplified, enlarged representation and in top view, shows a transport means according to the invention;

FIG. 3 shows a side view of the transport means of FIG. 2;

FIG. 4, in a representation similar to FIG. 2, shows another embodiment of the transport means according to the invention.

In the figures, 1 is a pressure cylinder, made of steel, of the reactor of a nuclear powerplant.

For reasons of safety, it is required that this pressure cylinder 1, the lines 2 leading to the pressure cylinder and the corresponding connection flanges 3 etc. be continually examined for possible changes, especially for cracks in the material. This is problematical in the sense that this inspection must be carried out in the radiation zone.

For this inspection, a robot 4 is provided, consisting essentially of a transport means 5 and an ultrasonic inspection means 6 provided on said transport means, whereby the pressure cylinder 1, the lines 2, flanges 3 etc. are to be inspected for the presence of defects or cracks in the material. The signals delivered by the measuring means 6 are transmitted to a station or monitoring and control means 7 spatially distant and located outside of the radiation zone, and are there evaluated, recorded etc. From the monitoring and control means 7, the travel of the robot 4 and hence of the ultrasonic measuring means is controlled as well. The monitoring and control means 7 and the robot 4 are connected to each other by way of a bundle of lines 8, containing all required electrical lines, for example to transmit measurement signals from the robot 4 to the monitoring and control means 7, to control the elements, yet to be described in more detail, of the robot, for the supply of current to the robot etc., as well as lines or hoses for media (compressed air, vacuum, hydraulics etc.). By virtue of the multiplicity of electric lines and hoses, the bundle 8 is of relatively great weight per running meter. For this reason, in addition to the main robot 4, auxiliary robots 4 'are provided, each comprising a transport means 5 likewise. With the transport means, the robot 4 and the auxiliary robots 4 'serving as carriers for the bundle of lines 8, i.e. for holding and handling the bundle 8, are movable also on the vertical outside surfaces of the pressure cylinder 1 and on the outgoing pipelines 2, under the control of the monitoring and control means 7 and/or a computer there provided in such manner that the robot 4 is capable of being moved to each site to be examined on the pressure cylinder 1 and pipelines 2.

Each transport means 5 is configured as a striding mechanism, again shown in enlarged detail in FIGS. 2 and 3. The transport means 5 consists essentially of four members 9, shown as plate-like in FIG. 2, connected to each other by way of four servo elements 10 to form a square, each member 9 being provided in the region of a corner of the square. The servo elements 10 are configured as individually actuable linear drives and each articulated at both ends by means of an articulation 11 to two members 9 succeeding one another in circumferential direction of the square, so that the four members 4 are connected to each other by way of the servo elements 10 and the articulations 11. The servo elements 10 are so configured and actuable that within a pre-assigned maximum servo range or travel, any arbitrary distance between two members 9 can be adjusted by the servo element provided between said members. In the embodiment shown, the articulations 11 are of such configuration that they make possible an articulate connection between the respective end of a servo element 10 and member 9 in all three mutually perpendicular spatial axes; that is, the articulations 11 are for example ball articulations.

The servo elements 10 are for example electrical, pneumatic or hydraulic linear drives. M designates an imaginary vertical median plane perpendicularly intersected by the centerline or axis of motion of the respective servo element 10. The two members 9 connected to each other by this servo element are disposed on either side of said median axis M.

As FIG. 3 shows, on each member 9, a lift element 12 is additionally provided, which bears a standing foot in the form of a retention element 13 at its lower end, projecting beyond the under side of the member 9.

With the aid of the lift elements 12, of which only one is provided for each retention element 13, each retention element 13 is individually raisable and lowerable, as indicated by the double arrow B in FIG. 3. In the embodiment shown, the retention elements are suction cups, acted upon by controlled negative pressure and venting. The retention elements 13 may alternatively be of some other conformation, for example as electromagnets to be activated in order to hold a retention element 13 and de-activated to release the retention element by an appropriate actuation of the servo elements 10, lift elements 12 and retention elements 13, a striding motion of each transport means 5 is possible in arbitrary directions, where in each stride of the said striding motion, preferably three retention elements 13 are fixed by suction or otherwise on the substrate 14, comprising for example the outer surface of the pressure cylinder 1 or a pipeline 2, while one retention element 13 is vented and lifted by its lifting element 12. By actuating the servo elements 10 of the member 9 associated with this released retention element 13, it or its retention element 13 is moved away from the other retention elements, i.e. it makes a stride. Then, in time succession, the other members 9 are made to follow by actuation of the servo elements 10, lift element 12 and retention element 13 in question, so that a caterpillar-like, advancing travel of the transport means is obtained. By differential actuation of the servo elements 10, this motion can be effected in any direction, namely, despite the linear travel of the servo elements, on either a rectilinear or a curvilinear path.

The actual robot 4 is provided on a platform (not shown) which in the embodiment shown is held to one of the members 9 by a carriage arrangement. With the aid of the carriage arrangement and drives not shown, the platform (not shown) and the ultrasonic measuring means 6 provided thereon is adjustable continuously or in small steps in two axes of a plane extending parallel to the substrate 14, as indicated by the axes X and Y in FIG. 2. The maximum travel possible by means of the carriage arrangement in each axial direction (for example by a multiplicity of small steps) is equal to or somewhat greater than the maximum travel or stride of the servo elements 10.

By this adjustment of the measuring means 6 on the two axes X and Y, in moving the transport means 5 along the substrate 14, large strides are possible for the particular member 9 or corresponding retention element 13, in order thus to achieve a sufficiently high speed of motion for the transport means 5a despite the stepwise motion of the member 9 and retention elements 13. By the fine positioning of the measuring means 6 by means of the carriage arrangement, each desired point can be reached by the measuring means, even on a very fine grid.

In the case of the auxiliary robots 4', a preferably swinging suspension for the bundle of lines 8 is provided on the platform (not shown), which in this case is fixedly connected to one of the members 9, and not by way of a carriage arrangement.

FIG. 4, in a representation like that of FIG. 2, shows another embodiment of a transport means 5a, differing from the [previous]transport means essentially only in that a total of eight members 9 are provided, each again comprising a lift element 12 with a retention element 13, and all interconnected by way of the servo elements 10 and articulations 11 to form a closed articulated polygon. In this embodiment also, all servo elements 10, lift elements 12 and retention elements 13 are individually actuable, to wit the servo elements 10 for the linear travel in axial direction of the lengthwise extent of said servo elements as before, all settings being reachable within a pre-assigned range of lift and/or travel.

The transport means 5a, owing to the larger number of retention elements 13, offers greater security. Furthermore, another motion, different from the motion of the members or retention elements 13 of the transport means 5, is possible, for example in the form that in the case of the transport means 5a, for a rectilinear travel, for example a rectilinear travel in the direction of the arrow C, the members 9 are moved along in groups, namely first the group of three members 9 at the right in FIG. 4, marked I, then the group II of two middle members 9, and finally the group III of three members 9 at the left.

The invention has been described above in terms of embodiments by way of example. It will be understood that numerous modifications and alterations are possible, without thereby departing from the guiding inventive idea.

Thus for example it is possible, in addition to the servo elements 10 and lift elements 12, to provide additional lift elements whereby the swing in the region of the articulations 11 can be controlled, and/or axes of swing of said articulations can be locked.

Further, it is possible also to configure the particular transport means in such a way that the number of members 9 differs from the number of such members in the transport means 5 and 5a described.

Again, it is possible to provide different transport means for the robots 4 and auxiliary robots 4', for example the transport means 5a for the robots 4 and the transport means 5 for at least some of the auxiliary robots 4'.

I claim:

1. Transport means for a controlled striding motion along a substrate (14), comprising:

(a) at least three striding elements (9) each comprising a foot element having a lift element (12) and being lowerable and raisable, respectively, in a first axial direction for placement upon and removal from the substrate (14) by means of said lift element (12), (b) servo elements (10) acting in between each of said striding elements (9), said striding elements (9) and servo elements (10) being connected to each other to form a polygon structure having corner regions in which the striding elements (9) form the corner regions of the polygon structure and in which two striding elements (9) are connected to each other by at least one servo element (10) in each instance to generate a linear motion between said two striding elements towards and away from each other within a preselected travel in an axis of motion, (c) with the striding elements (9) connected by way of at least one servo element (10) being arranged on either side of an imaginary median plane (M) intersecting said axis of motion at a right angle, and (d) with each servo element (10) being articulated by way of an articulating arrangement to the striding element (9) pivotably about at least two axes in space.

2. Transport means according to claim 1, characterized in that each servo element (10) is articulated by way of the articulating arrangement (11) to the striding elements (9) pivotably about three axes in space.

3. Transport means for a controlled striding motion along a substrate (14), comprising:

(a) at least four striding elements (9) each comprising a foot element having a lift element (12) and being lowerable and raisable, respectively, in a first axial direction for placement upon and removal from the substrate (14) by means of said lift element (12), (b) at least four servo elements (10) acting in between each of said striding elements (9), (c) said striding elements (9) and servo elements (10) being connected to each other to form a polygon structure having corner regions in which the striding elements (9) form the corner regions of the polygon structure and in which two striding elements (9) are connected to each other by at least one servo element (10) in each instance to generate a linear motion between said two striding elements towards and away from each other within a preselected travel in an axis of motion, (d) with the striding elements (9) connected by way of at least one servo element (10) being arranged on either side of an imaginary median plane (M) intersecting said axis of motion at a right angle, and (e) with each servo element (10) being articulated by way of an articulating arrangement to the striding element (9) pivotably about at least two axes in space.

4. Transport means for a controlled striding motion along a substrate (14), comprising:

(a) at least three striding elements (9) each comprising a foot element having a lift element (12) and being lowerable and raisable, respectively, in a first axial direction for placement upon and removal from the substrate (14) by means of said lift element (12), (b) servo elements (10) acting in between each of said striding elements (9), all said striding elements (9) and servo elements (10) being connected to each other to form a polygon structure having corner regions in which the striding elements (9) form the corner regions of a polygon structure and in which two striding elements (9) are connected to each other by at least one servo element (10) in each instance to generate a linear motion between said two striding elements towards and away from each other within a preselected travel in an axis of motion, with the striding elements (9) connected by way of at least one servo element (10) being arranged on either side of an imaginary median plane (M) intersecting said axis of motion at a right angle.

5. Transport means according to claim 4, characterized in that the number of servo elements (10) is a multiple of the number of striding elements (9).

6. Transport means according to claim 4, characterized in that the lift elements (12) and the servo elements (10) are pneumatic elements.

7. Transport means according to claim 4, characterized in that the lift elements (12) and the servo elements (10) are hydraulic elements.

8. Transport means according to claim 4, characterized in that each servo element (10) connects two striding elements (9) to each other in the manner of a guide link.

9. Transport means according to claim 4, characterized in that the servo element (10) is articulated at at least one end to at least one striding element (9) by way of an articulating arrangement comprising at least one articulation (11), pivotably about at least one axis.

10. Transport means according to claim 9, characterized in that the servo element (10) is articulated by way of the articulating arrangement (11) to the striding element (9) pivotably about at least two axes in space.

11. Transport means according to claim 9, characterized in that the servo element (10) is articulated by way of the articulation to both of the striding elements (9) between which the said servo element (10) acts.

12. Transport mean according to claim 4, characterized in that the servo elements (10) and the striding elements (9) alternate in the polygon structure.

13. Transport means according to claim 12, characterized by at least four striding elements (9) and at least four servo elements (10) acting between the said striding elements (9).

14. Transport means according to claim 13, characterized in that more than four striding elements (9) are provided.

15. Transport means according to claim 4, characterized in that the number of servo elements (10) is equal to the number of striding elements (9).

16. Transport means according to claim 4, characterized in that the servo elements (10) and the lift elements (12) are individually actuable singly or in groups by a control means (7).

17. Transport means according to claim 4, characterized in that a member (15) is provided thereon which, by means of a carriage arrangement, is movable with a maximum travel.

18. Transport means according to claim 17, characterized in that the maximum travel of the carriage arrangement is equal to the maximum travel of at least one servo element (10).

19. Transport means according to claim 4, characterized in that each foot element has retention elements in the form of clinging means made up of suction cups.

20. Transport means according to claim 4, characterized in that the lift elements (12) and the servo elements (10) are electrical elements.

21. Transport means according to claim 4, characterized by their configuration as part of a robot (4) having an operating apparatus (6).

22. Transport means according to claim 21, characterized by its configuration as an auxiliary robot (4') to hold and handle lines or bundles of lines of an operating apparatus (6) on a control means (7).

* * * * *